(12) United States Patent
Seol

(10) Patent No.: US 12,195,095 B2
(45) Date of Patent: Jan. 14, 2025

(54) RACK HOUSING AND VEHICLE STEERING DEVICE

(71) Applicant: HL MANDO CORPORATION, Pyeongtaek-si (KR)

(72) Inventor: Gabsoo Seol, Gwangmyeong-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/384,779

(22) Filed: Oct. 27, 2023

(65) Prior Publication Data

US 2024/0326898 A1 Oct. 3, 2024

(30) Foreign Application Priority Data

Mar. 27, 2023 (KR) .................. 10-2023-0039929

(51) Int. Cl.
*B62D 3/12* (2006.01)
(52) U.S. Cl.
CPC ...................................... *B62D 3/12* (2013.01)
(58) Field of Classification Search
CPC ........................................................ B62D 3/12
See application file for complete search history.

(56) References Cited

U.S. PATENT DOCUMENTS

2021/0129897 A1* 5/2021 Ryu ...................... B62D 3/123

FOREIGN PATENT DOCUMENTS

| CN | 106467128 B | * | 3/2020 | ............... B62D 3/12 |
| EP | 134003 A | * | 3/1985 | ............... B62D 3/12 |
| EP | 134004 A | * | 3/1985 | ............... B62D 3/12 |
| EP | 0134004 A1 | * | 3/1985 | |
| FR | 2979319 A1 | * | 3/2013 | ............... B62D 3/12 |
| GB | 2437721 A | * | 11/2007 | ............... B62D 3/12 |
| JP | 2024086089 A | * | 6/2024 | |
| JP | S6038258 A | * | 6/2024 | |

* cited by examiner

*Primary Examiner* — Nicole T Verley
(74) *Attorney, Agent, or Firm* — Hauptman Ham, LLP

(57) ABSTRACT

According to the present exemplary embodiments, a rack housing having a body, a rack bar and a cover is disclosed and configured to mitigate a sense of being stuck during steering, reducing component wear and damage due to load concentration, and prevent deterioration of case of assembly by supporting the reverse input load that causes the rack bar to bend.

11 Claims, 6 Drawing Sheets

(A)

(B)

RACK HOUSING AND VEHICLE STEERING DEVICE

CROSS-REFERENCE TO RELATED APPLICATION

The present application claims priority to Korean Patent Application No. 10-2023-0039929, filed on Mar. 27, 2023, which is hereby incorporated by reference.

BACKGROUND

Field

The present embodiments relate to a rack housing and vehicle steering device and, more specifically, to a rack housing and vehicle steering device that supports the reverse input load causing the rack bar to bend, thereby mitigating a sense of being stuck during steering, reducing component wear and damage due to load concentration, and preventing deterioration of ease of assembly.

Description of Related Art

A vehicle steering device is a device capable of changing the traveling direction of the vehicle as intended by the user. A pinion shaft with a pinion gear is provided at an end portion of the steering shaft that is rotated by the user's steering wheel manipulation. The rack bar has a rack gear that is teeth engaged with the pinion gear, allowing the rotation of the steering shaft into the linear motion of the rack bar when the driver manipulates the steering wheel. The linear motion of the rack bar is transferred to the tie rods and knuckles connected to two opposite ends of the rack bar, rotating the wheels and hence changing the traveling direction of the vehicle.

The rack bar is provided in a hollow rack housing with two opposite side openings. A rack busing is provided between the rack bar and the rack housing, supporting the rack bar on the rack housing to allow the rack bar to linearly move smoothly in the axial direction. The rack bushing supports the reverse input load transferred from the road surface to the rack bar during vehicle driving to allow the rack bar to linearly move smoothly, thereby preventing the rack bar from bending.

However, since the linear movement of the rack bar increases as the steering angle increases, the bending moment due to the reverse input load increases. The increased moment may cause the rack bushing to be excessively compressed, so that the rack bar may come in direct contact with the rack housing or the load may be applied even to other components. This may lead to a sense of being stuck and component wear or damage during steering.

It is possible to increase the load that may be supported by the rack bushing by reducing the assembly gap between the rack bushing and the rack bar. However, reducing the inner diameter of the rack bushing may deteriorate ease of assembly.

The information included in this Background of the present disclosure is only for enhancement of understanding of the general background of the present disclosure and may not be taken as an acknowledgement or any form of suggestion that this information forms the prior art already known to a person skilled in the art.

SUMMARY

Various aspects of the present disclosure are directed to a rack housing and vehicle steering device that supports the reverse input load causing the rack bar to bend, thereby mitigating a sense of being stuck during steering, reducing component wear and damage due to load concentration, and preventing deterioration of ease of assembly.

Another aspect of the present disclosure is directed to a rack housing comprising a body having a receiving hole where a rack bar is received and a cover coupled to the body. The cover having an insertion hole where an end portion of the rack bar is inserted, wherein a central axis of the insertion hole is eccentric with respect to a central axis of the receiving hole.

Still another aspect of the present disclosure is directed to a vehicle steering device comprising a rack bar, a rack housing including a body having a receiving hole where the rack bar is received and a cover coupled to the body and having an insertion hole where an end portion of the rack bar is inserted, wherein a central axis of the insertion hole is eccentric with respect to a central axis of the receiving hole, a tie rod coupled to two opposite ends of the rack bar via a ball joint, and a rack bushing seated in the insertion hole.

According to the present embodiments, it is possible to mitigate a sense of being stuck during steering, reducing component wear and damage due to load concentration, and prevent deterioration of ease of assembly by supporting the reverse input load that causes the rack bar to bend.

DESCRIPTION OF DRAWINGS

The above and other objects, features, and advantages of the disclosure will be more clearly understood from the following detailed description, taken in conjunction with the accompanying drawings, in which.

Figure 1:
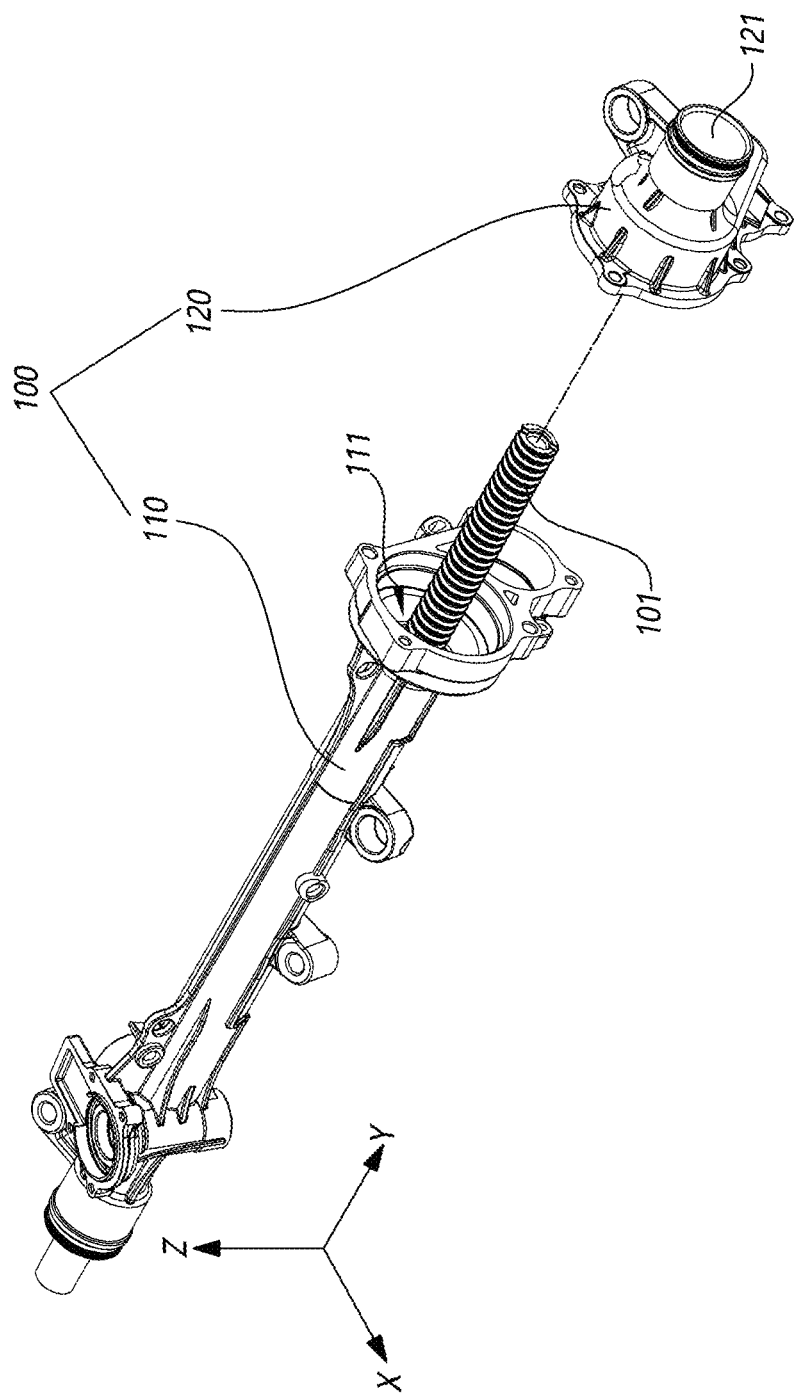
FIG. 1 is an exploded perspective view illustrating a rack housing and a vehicle steering device according to an exemplary embodiment of the present embodiments.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
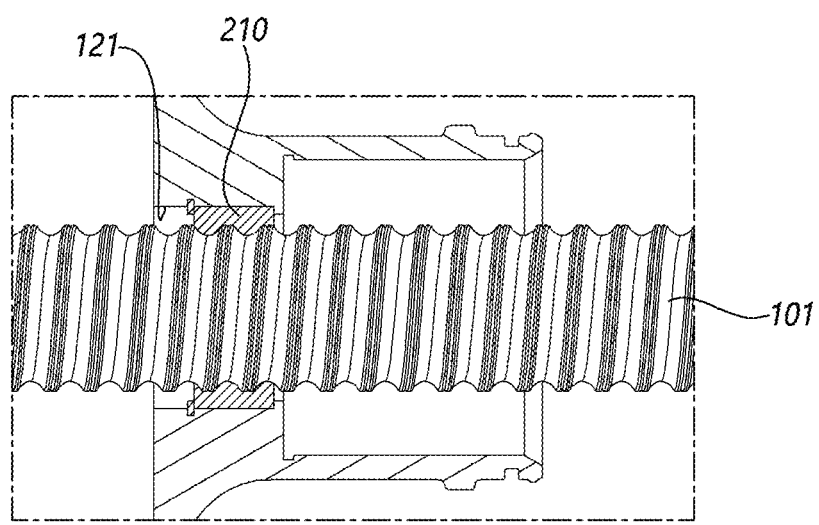
FIG. 2 is a cross-sectional view illustrating part of a rack housing and a vehicle steering device according to the exemplary embodiment of present embodiments.
Figure 3:
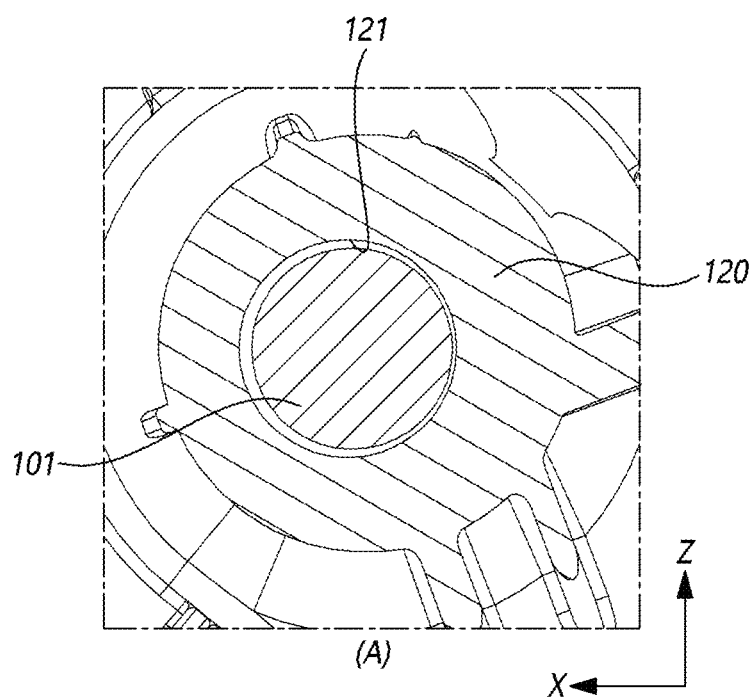
FIG. 3 is a cross-sectional view illustrating part of a rack housing and a vehicle steering device according to the exemplary embodiment of present embodiments.
Figure 3:
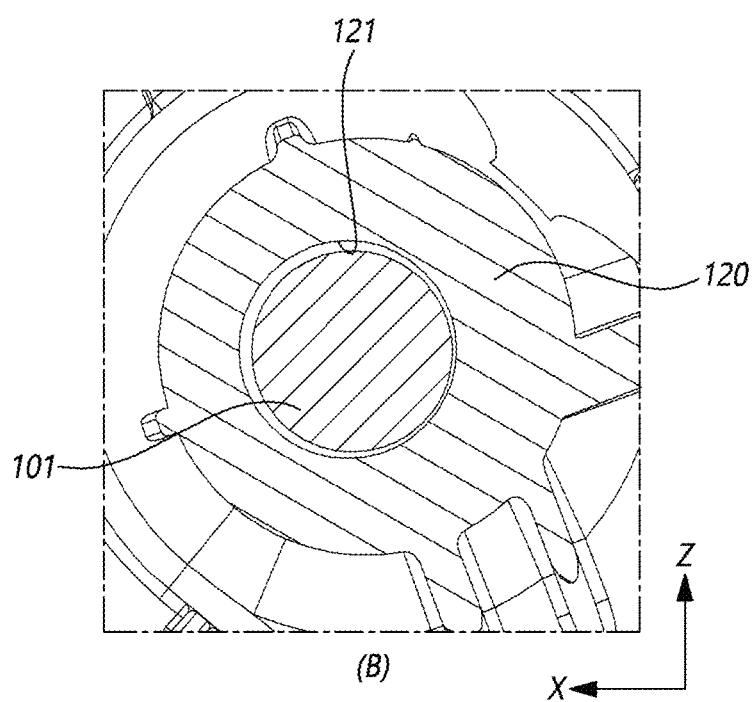
Figure 4:
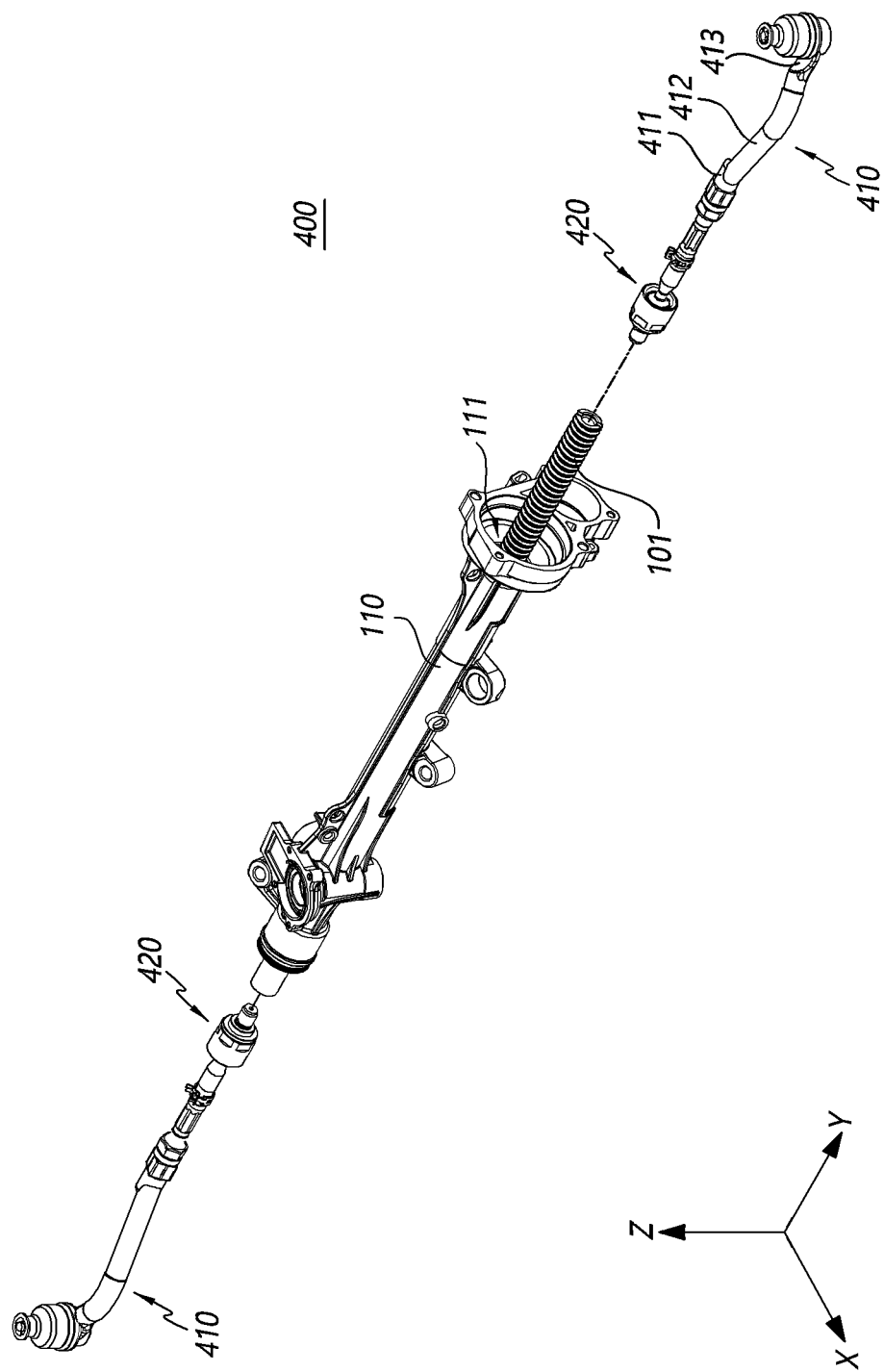
FIG. 4 is an exploded perspective view illustrating a rack housing and a vehicle steering device according to the exemplary embodiment of present embodiments.
Figure 5:
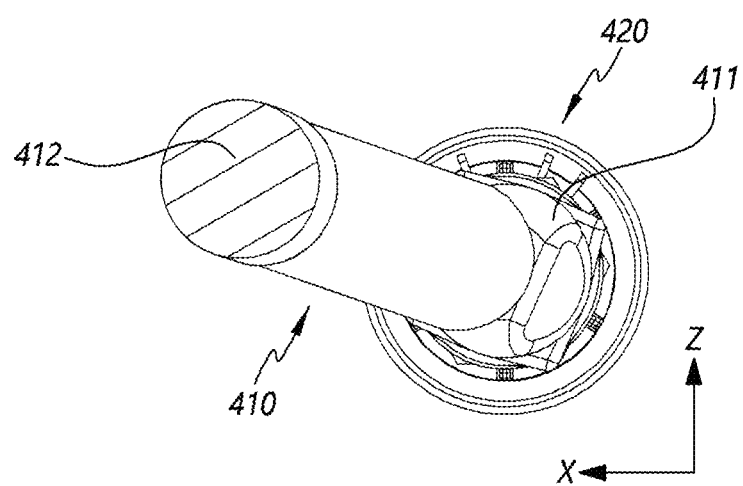
FIG. 5 is a cross-sectional view illustrating a portion of a steering device of a vehicle according to the exemplary embodiment of present embodiments.
Figure 6:
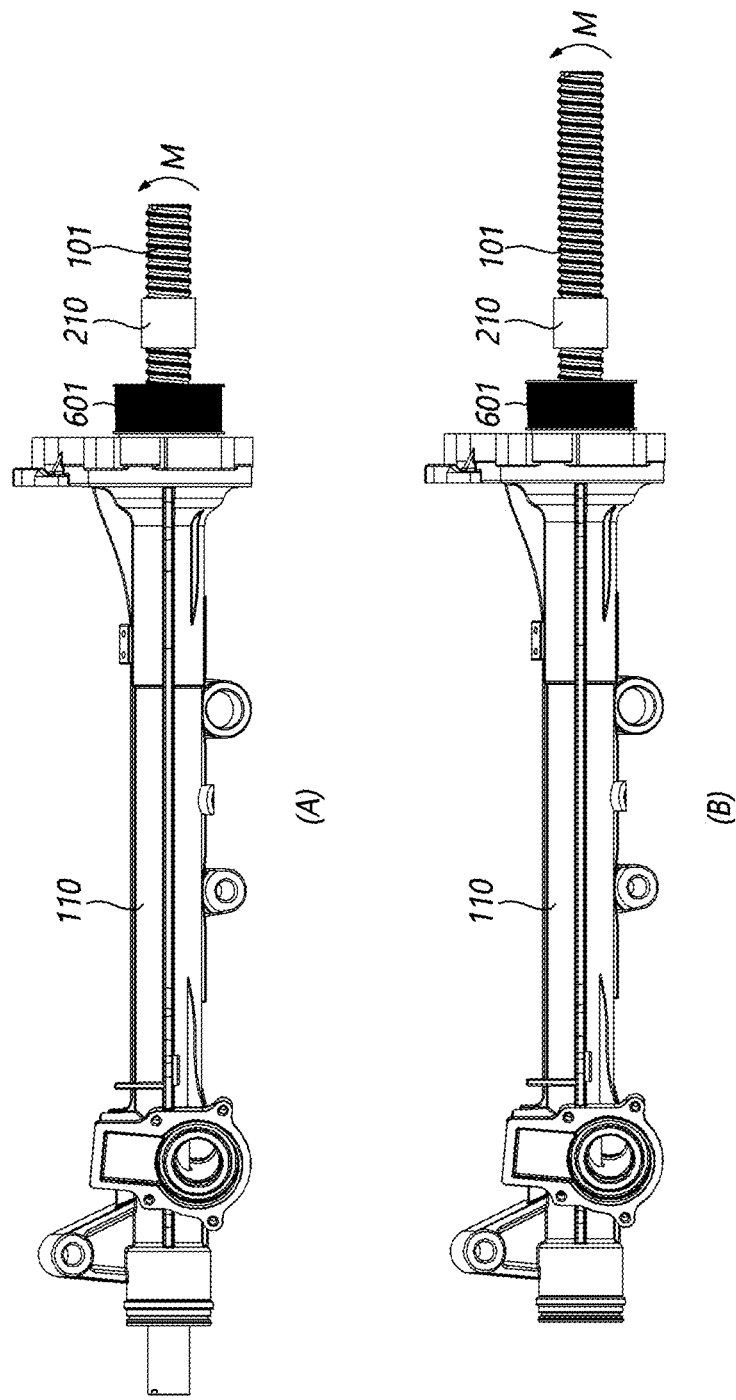
FIG. 6 is a side view illustrating part of a rack housing and a vehicle steering device according to the exemplary embodiment of present embodiments.

FIG. 1 is an exploded perspective view illustrating a rack housing and a vehicle steering device according to the present exemplary embodiments. FIG. 2 is a cross-sectional view illustrating part of a rack housing and a vehicle steering device according to the present exemplary embodiments. FIG. 3 is a cross-sectional view illustrating part of a rack housing and a vehicle steering device according to the present exemplary embodiments. FIG. 4 is an exploded perspective view illustrating a rack housing and a vehicle steering device according to the present exemplary embodiments. FIG. 5 is a cross-sectional view illustrating a portion of a steering device of a vehicle according to the present exemplary embodiments. FIG. 6 is a side view illustrating part of a rack housing and a vehicle steering device according to the present exemplary embodiments.

A rack housing 100 according to the present exemplary embodiments includes a body 110 having a receiving hole 111 where a rack bar 101 is received and a cover 120 coupled to the body 110 and having an insertion hole 121 where an end portion of the rack bar 101 is inserted. A central axis of the insertion hole 121 may be eccentric with respect to a central axis of the receiving hole 111. In another exemplary embodiment, the central axis of the insertion hole 121 may be concentric with respect to a central axis of the receiving hole 111.

Referring to FIGS. 1-3, a rack housing 100 according to the present exemplary embodiments includes a body 110 and a cover 120.

The body 110 has a receiving hole 111 where a rack bar 101 is received. A pinion shaft connected to the steering shaft and engaged with the rack bar 101 may be coupled to the body 110. The rack bar 101 is linearly moved in the axial direction in the receiving hole 111 by the driver's steering wheel manipulation. Further, a motor 130 may be coupled to the body 110 to provide power for assisting the driver's steering wheel manipulation to the rack bar 101. The motor 130 may provide the assist power to the rack bar 101 through a reducer (not shown), e.g., a ball nut reducer. The structures of the pinion shaft, power assist motor 130, and ball nut reducer are well known, and no detailed description and illustration thereof are given.

The cover 120 is coupled to one end of the body 110, and has an insertion hole 121 where an end portion of the rack bar 101 is inserted. The cover 120 may receive the reducer for connecting the power assist motor 130 with the rack bar 101 between it and the body 110. The rack bar 101 is axially moved while being positioned in the receiving hole 111 of the body 110 and the insertion hole 121 of the cover 120.

Referring to FIG. 2, as described below in more detail, a rack bushing 210 may be disposed in the insertion hole 121 to support the reverse input load transferred to the rack bar 101. The rack bar 101 to which the reverse input load is applied is supported by the rack bushing 210, and the rack bushing 210 supports the reverse input load to suppress the rack bar 101 from bending. As the rack bushing 210 absorbs the bending moment (M) caused by the reverse input load, friction may be generated as the rack bar 101 is directly supported on the rack housing 100. In turn, component wear and damage caused as the load may be transferred to the surrounding components (e.g., the ball nut reducer) are prevented.

The bending moment (M) applied to the rack bar 101 may further increase as the steering angle increases and/or as the movement amount of the rack bar 101 increases. Referring to FIG. 6, (A) of FIG. 6 illustrates a neutral state and (B) of FIG. 6 illustrates a state in which the rack bar 101 is slid to one side by manipulation of the steering wheel. Since the reverse input load from the ground is transferred to the end of the rack bar 101 through a tie rod, knuckle arm, etc., the bending moment (M) may increase as the movement amount of the rack bar 101 increases, as shown in FIG. 6(B). When the bending moment (M) is applied to the nut pulley 601, the gear teeth of the nut pulley 601 may be worn or damaged. However, according to the present exemplary embodiments, it may be possible to effectively suppress the bending of the rack bar 101 due to the bending moment (M), which is further increased in a specific situation, and, thus prevent the load from being applied to surrounding components, such as the nut pulley 601.

As shown in FIG. 3, a central axis of the insertion hole 121 is eccentric with respect to the central axis of the receiving hole 111. This configuration may promote the rack bushing 210 more effectively absorbing the reverse input load. The receiving hole 111 may be coaxial with the rack bar 101, and the insertion hole 121 may be parallel to the rack bar 101 while having an eccentric central axis. As the central axis of the insertion hole 121 is eccentric with respect to the central axis of the receiving hole 111, the interval between the outer circumferential surface of the rack bar 101 and the inner circumferential surface of the insertion hole 121 may not be constant along the circumferential direction. The interval may be narrowest in the direction in which the central axis of the insertion hole 121 is eccentric while being widest in the opposite direction.

Referring to (A) of FIG. 3, according to an embodiment, the central axis of the insertion hole 121 may be horizontally eccentric with respect to the central axis of the receiving hole 111. For example, the central axis of the insertion hole 121 may be eccentric with respect to the central axis of the receiving hole 111 in a horizontal direction (parallel to the ground). The drawings illustrate an embodiment of being eccentric in the x direction. In some embodiments, the central axis of the insertion hole 121 may be eccentric with respect to the central axis of the receiving hole 111 in a vertical direction (perpendicular to the ground).

Referring to (B) of FIG. 3, according to an embodiment, the central axis of the insertion hole 121 may be horizontally and vertically eccentric with respect to the central axis of the receiving hole 111. For example, the central axis of the insertion hole 121 may be eccentric in a horizontal direction parallel to the ground and a vertical direction perpendicular to the ground. The drawings illustrate an embodiment of being eccentric in the x direction and z direction. In some embodiment, the central axis of the insertion hole 121 may be eccentric in a horizontal direction parallel to the ground or a vertical direction perpendicular to the ground.

The radial thickness of the rack bushing 210 may be constant. For example, the shape of the rack bushing 210 may not be given directivity for supporting the reverse input load provided in a specific direction. Therefore, there is no need to consider the assembly direction of the rack bushing 210 during assembly, which simplifies the assembly process.

As the insertion hole 121 may be formed to be eccentric with respect to the receiving hole 111, the inner circumferential surface of the rack bushing 210 seated in the insertion hole 121 may also be eccentric with respect to the receiving hole 111. Therefore, the interval between the outer circumferential surface of the rack bar 101 and the inner circumferential surface of the rack bushing 210 may not be constant along the circumferential direction. It may be narrowest in the direction in which the central axis of the insertion hole 121 is eccentric while being widest in the opposite direction. For example, there can be an assembly gap for assembly between the inner diameter of the rack bushing 210 and the outer diameter of the rack bar 101. This assembly gap may not be constant along the circumferential direction but may be narrowest in the direction in which the central axis of the insertion hole 121 is eccentric while being widest in the opposite direction. In the embodiment shown in (A) and (B) of FIG. 3, the gap between the rack bushing 210 and the rack bar 101 is narrowest in the direction in which the central axis of the insertion hole 121 is eccentric, and is widest in the opposite direction. However, it should be noted that (A) and (B) of FIG. 3 are exaggerated for convenience of illustration and understanding.

Further, the rack bushing 210 and the rack bar 101 may contact each other in an area where the gap between the rack bushing 210 and the rack bar 101 is the narrowest. At least a portion of the rack bushing 210 may be seated in the insertion hole 121 in a compressed state. For example, the rack bushing 210 may be seated in the insertion hole 121 in a state in which the portion in the direction in which the insertion hole 121 is eccentric with respect to the receiving hole 111 in the compressed state. The compressed portion of the rack bushing 210 may provide a preload to the rack bar 101, so that the reverse input load may be effectively supported.

The insertion hole 121 is eccentric with respect to the receiving hole 111 to suppress bending of the rack bar 101 due to the reverse input load. For example, as the insertion hole 121 is eccentric with respect to the receiving hole 111, the gap between the rack bushing 210 and the rack bar 101 is not constant but may be narrowest in a specific area in the eccentric direction. Thus, it is possible to suppress bending of the rack bar 101 by disposing the specific area to support the reverse input load applied to the rack bar 101. For example, if the gap between the rack bushing 210 and the rack bar 101 is constant, the rack bushing 210 may not provide a support force corresponding to the reverse input load provided to the rack bar 101. However, as the insertion hole 121 is eccentric with respect to the receiving hole 111, it may provide a support force corresponding to the reverse input load provided to the rack bar 101 by the rack bushing 210. The reverse input load provided to the rack bar 101 is determined by the articulation angle of the tie rod 410, which is described below in detail. For example, as the insertion hole 121 is eccentric with respect to the receiving hole 111 in response to the articulation angle of the tie rod 410, it is possible to effectively respond to the reverse input load provided to the rack bar 101, suppressing bending of the rack bar 101. Therefore, it is possible to mitigate a sense of being stuck during steering and reduce component wear and damage due to load concentration. Further, as the insertion hole 121 is eccentric with respect to the receiving hole 111, but the gap between the rack bushing 210 and the rack bar 101 is not reduced, assembly convenience does not deteriorate.

Conventionally, there has been an attempt to support the reverse input load applied in a specific direction by forming an additional component, e.g., a protrusion, in the rack bushing in the specific direction. However, the conventional structure requires that assembly be performed with the assembly direction of the rack bushing aligned with the direction of the reverse input load, which makes the assembly process cumbersome and it difficult to remain constant in production quality. However, according to the present exemplary embodiments, since directivity is given to the insertion hole 121 of the cover 120, not to the rack bushing 210, assembly simplicity can be achieved without the need for considering the assembly direction of the rack bushing 210.

A vehicle steering device according to the present exemplary embodiments includes a rack bar 101, a rack housing 100 including a body 110 having a receiving hole 111 where the rack bar 101 is received and a cover 120 coupled to the body 110 and having an insertion hole 121 where an end portion of the rack bar 101 is inserted, wherein a central axis of the insertion hole 121 is eccentric with respect to a central axis of the receiving hole 111, a tie rod 410 coupled to two opposite ends of the rack bar 101 via a ball joint 420, and a rack bushing 210 seated in the insertion hole. The same features as those of the above-described embodiments will be briefly described.

Referring to FIGS. 1 to 6, a vehicle steering device 400 according to the present exemplary embodiments includes a rack bar 101, a rack housing 100, a tie rod 410, and a rack bushing 210. It is possible to suppress bending of the rack bar 101 by supporting the reverse input load transferred to the rack bar 101 through the tie rod 410, and the central axis of the insertion hole 121 is eccentric with respect to the central axis of the receiving hole 111. Accordingly, direct support of the rack bar 101 on the rack housing 100 or transfer of the load to the surrounding components, e.g., the reducer, is prevented, mitigating a sense of being stuck during steering and reducing component wear and damage due to load concentration. Further, as the insertion hole 121 is eccentric with respect to the receiving hole 111, the gap between the rack bushing 210 and the rack bar 101 is not reduced, and, thus, assembly convenience does not deteriorate.

According to an embodiment, the central axis of the insertion hole 121 may be horizontally eccentric with respect to the central axis of the receiving hole 111. In some embodiments, the central axis of the insertion hole 121 may be vertically eccentric with respect to the central axis of the receiving hole 111. In some embodiments, the central axis of the insertion hole 121 may be vertically or horizontally eccentric with respect to the central axis of the receiving hole 111.

According to an embodiment, the central axis of the insertion hole 121 may be horizontally and vertically eccentric with respect to the central axis of the receiving hole 111. Referring to FIGS. 4 and 5, according to an embodiment, the vehicle steering device 400 according to the present exemplary embodiments may further include tie rods 410 coupled to two opposite ends of the rack bar 101 via ball joints 420. According to an embodiment, the tie rod 410 includes a first end 411 coupled to the rack bar 101, a second end 413 coupled to a knuckle (not shown), and a connector 412 connecting the first end 411 and the second end 413. The connector 412 may bend from the first end 411 in a first direction horizontal thereto and/or a second direction perpendicular thereto.

The direction of the reverse input load transferred to the rack bar 101 through the tie rod 410 is determined by the angle of the connector 412 from the first end 411 of the tie rod 410. The connector 412 may bend from the first end 411 in the horizontal direction and vertical direction as shown in FIG. 5. The drawings illustrate an embodiment in which the first direction in which the connector 412 horizontally bends is the x direction, and the second direction in which it vertically bends is the z direction. As the central axis of the insertion hole 121 is eccentric with respect to the central axis of the receiving hole 111 at the bending angle of the connector 412, the rack bar 101 may support the reverse input load, suppressing bending of the rack bar 101.

According to an embodiment, the central axis of the insertion hole 121 may be eccentric with respect to the central axis of the receiving hole 111 in the first direction, and the rack bushing 210 seated in the insertion hole 121 may provide a support force corresponding to the reverse input load. Or, according to an embodiment, the central axis of the insertion hole 121 may be eccentric with respect to the central axis of the receiving hole 111 in the first direction and steering device reducer, and the rack bushing 210 seated in the insertion hole 121 may provide a support force corresponding to the reverse input load. When the insertion hole 121 is eccentric with respect to the receiving hole 111 in both the first direction and steering device reducer, it may be possible to more effectively respond to the reverse input load. However, although the insertion hole 121 is eccentric with respect to the receiving hole 111 only in the first direction which is the horizontal direction, it may be possible to respond to the reverse input load sufficiently in an effective manner while further increasing manufacture convenience of the rack housing 100.

According to an embodiment, the radial thickness of the rack bushing 210 may be constant. For example, the rack bushing 210 is not given directivity for supporting the reverse input load which is provided in a specific direction, eliminating the need for considering the assembly direction of the rack bushing 210 during assembly and hence simplifying the assembly process.

According to an embodiment, the central axis of the insertion hole 121 may be eccentric with respect to the central axis of the receiving hole 111 by the assembly gap between the rack bushing 210 and the outer diameter of the rack bar 101. According to an embodiment, the assembly gap between the rack bushing 210 and the outer diameter of the rack bar 101 may be 0.12 mm or more and 0.24 mm or less. The assembly gap may be at least 0.1 mm. The assembly gap may be at least 0.11 mm. The assembly gap may be at least 0.12 mm. The assembly gap may be at least 0.13 mm. The assembly gap may be at least 0.14 mm. The assembly gap may be at least 0.15 mm. The assembly gap may be at least 0.16 mm. The assembly gap may be at least 0.17 mm. The assembly gap may be at least 0.18 mm. The assembly gap may be at least 0.19 mm. The assembly gap may be at least 0.2 mm. The assembly gap may be at least 0.21 mm. The assembly gap may be at least 0.22 mm. The assembly gap may be at least 0.23 mm. The assembly gap may be at least 0.24 mm. The assembly gap may be at least 0.25 mm. The assembly gap may be at least 0.3 mm. The assembly gap may be at least 0.4 mm. The assembly gap may be at least 0.5 mm.

According to an embodiment, the central axis of the insertion hole 121 may be eccentric with respect to the central axis of the receiving hole 111 by a degree larger than the assembly gap between the rack bushing 210 and the outer diameter of the rack bar 101. Accordingly, in the eccentric direction of the central axis of the insertion hole 121, the portion of the rack bushing 210 situated between the inner diameter of the insertion hole 121 and the outer diameter of the rack bar 101 may be provided in a compressed state. The compressed portion of the rack bushing 210 may provide a preload to the rack bar 101, supporting the reverse input load.

According to an embodiment, at least a portion of the rack bushing 210 may be seated in the insertion hole 121 in a compressed state. Therefore, the compressed portion of the rack bushing 210 may provide a preload to the rack bar 101, more effectively responding to the reverse input load.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the 5 scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A vehicle steering device, comprising:
   a rack bar;
   a rack housing including a body having a receiving hole where the rack bar is received and a cover coupled to the body and having an insertion hole where an end portion of the rack bar is inserted, wherein a central axis of the insertion hole is eccentric with respect to a central axis of the receiving hole;
   a tie rod coupled to two opposite ends of the rack bar via a ball joint; and
   a rack bushing seated in the insertion hole.

2. The vehicle steering device of claim 1, wherein the central axis of the insertion hole is eccentric from the central axis of the receiving hole in a horizontal direction.

3. The vehicle steering device of claim 1, wherein the central axis of the insertion hole is eccentric with respect to the central axis of the receiving hole in a horizontal direction and a vertical direction.

4. The vehicle steering device of claim 3, wherein the tie rod includes a first end coupled to the rack bar, a second end coupled to a knuckle, and a connector connecting the first end and the second end, and
   wherein the connector bends in a first direction horizontal to the first end and/or a second direction perpendicular to the first end.

5. The vehicle steering device of claim 4, wherein the central axis of the insertion hole is eccentric with respect to the central axis of the receiving hole in the first direction.

6. The vehicle steering device of claim 4, wherein the central axis of the insertion hole is eccentric from the central axis of the receiving hole in the first direction and the second direction.

7. The vehicle steering device of claim 1, wherein the rack bushing has a constant radial thickness.

8. The vehicle steering device of claim 1, wherein the central axis of the insertion hole is eccentric with respect to the central axis of the receiving hole by an assembly gap between an inner diameter of the rack bushing and an outer diameter of the rack bar.

9. The vehicle steering device of claim 8, wherein the assembly gap is 0.12 mm or more and 0.24 mm or less.

10. The vehicle steering device of claim 1, wherein the central axis of the insertion hole is eccentric with respect to the central axis of the receiving hole by a degree larger than an assembly gap between an inner diameter of the rack bushing and an outer diameter of the rack bar.

11. The vehicle steering device of claim 1, wherein the rack bushing is seated in the insertion hole, with at least a portion thereof compressed.

\* \* \* \* \*